United States Patent [19]
Parker

[11] Patent Number: 4,584,335
[45] Date of Patent: Apr. 22, 1986

[54] 5-KETO-BIS(HYDROXYPHENYL)ANTHRACENE POLYARYLATE COPOLYMERS AND ALLOYS

[75] Inventor: Phillip H. Parker, San Rafael, Calif.

[73] Assignee: Chevron Research Company, San Francisco, Calif.

[21] Appl. No.: 687,081

[22] Filed: Dec. 28, 1984

[51] Int. Cl.$^4$ .............................................. C08G 63/18
[52] U.S. Cl. ..................................... 525/177; 525/132; 525/173; 525/174; 525/439; 528/125; 528/126; 528/128; 528/190; 528/191; 528/193; 528/194
[58] Field of Search ............... 528/125, 126, 128, 190, 528/191, 193, 194; 525/173, 174, 177, 439, 132

[56] References Cited
U.S. PATENT DOCUMENTS 4,188,476 2/1980 Irwin .................................. 528/128
4,221,895 9/1980 Woo .................................... 528/128
4,224,433 9/1980 Calundann et al. ................ 528/125
4,387,209 6/1983 Rieder et al. ...................... 528/190
4,456,746 6/1984 Horner ............................... 528/128

FOREIGN PATENT DOCUMENTS 8074718 5/1983 Japan ................................. 528/190

Primary Examiner—Lester L. Lee
Attorney, Agent, or Firm—T. G. DeJonghe; C. J. Caroli

[57] ABSTRACT

Polyarylate polymers derived from (A) mixtures of 5-keto-bis(hydroxyphenyl)anthracene compounds with other bisphenols and (B) a mixture of isophthalic and terephthalic acid. Also disclosed are polyarylate alloy compositions comprising a 5-keto-bis(hydroxyphenyl)anthracene polyarylate and a polymer resin selected from polybisphenol A carbonate and polystyrene.

50 Claims, No Drawings

5-KETO-BIS(HYDROXYPHENYL)ANTHRACENE POLYARYLATE COPOLYMERS AND ALLOYS

BACKGROUND OF THE INVENTION

The present invention relates to polyarylate copolymers and alloys. More particularly, this invention relates to 5-keto-bis(hydroxyphenyl)anthracene polyarylate copolymers and alloys having superior thermal properties.

Polyarylates are defined as aromatic polyester polymers derived from dihydroxy aromatic compounds (diphenols) and aromatic dicarboxylic acids.

In general, aromatic polyesters prepared from bisphenols or functional derivatives thereof and a terephthalic acid-isophthalic acid mixture or a mixture of the functional derivatives thereof, i.e., bisphenol terephthalate-bisphenol isophthalate polyesters, have excellent mechanical properties, such as tensile strength, bending strength, bending recovery or impact strength, excellent thermal properties, such as deflection temperature under load or degradation temperature, excellent electrical properties, such as resistivity, electric breakdown endurance, arc resistance, dielectric constant or dielectric loss and low flammability, good dimensional stability, and the like.

These aromatic polyesters are thus useful in many fields. Aromatic polyesters find special use as plastics for injection molding, extrusion molding, press molding, and the like, as monofilaments, fibers, films and coatings.

U.S. Pat. No. 3,216,970 describes polyarylates which include polymers of bisphenol A and isophthalic acid or a mixture of isophthalic acid and terephthalic acid. These polyarylates are prepared by converting the phthalic acid component to the diacid chloride which is then reacted with the bisphenol A or its sodium salt.

U.S. Pat. No. 3,884,990 describes a blend of various bisphenol polyarylates and poly(ethylene oxybenzoate), which is useful for producing molded articles having improved cracking and crazing resistance. Similarly, U.S. Pat. No. 3,946,091 describes a blend of bisphenol polyarylates and poly(ethylene terephthalate) which provides molded articles of reduced crazing.

U.S. Pat. No. 3,792,118 describes a styrene resin composition resistant to heat deformation which comprises a blend of polyarylene esters and various styrene resins.

SUMMARY OF THE INVENTION

The present invention provides a polyarylate copolymer derived from (A) a mixture of a 5-keto-bis(hydroxyphenyl)-anthracene compound of the formula

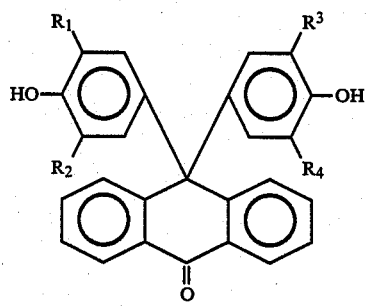

wherein $R_1$, $R_2$, $R_3$ and $R_4$ are independently hydrogen, lower alkyl of 1 to 4 carbon atoms or phenyl;
and a bisphenol compound selected from the group consisting of

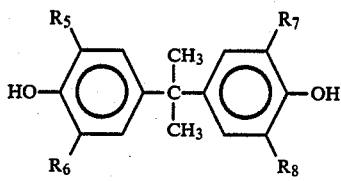

wherein $R_5$, $R_6$, $R_7$ and $R_8$ are independently hydrogen, lower alkyl of 1 to 4 carbon atoms or phenyl;

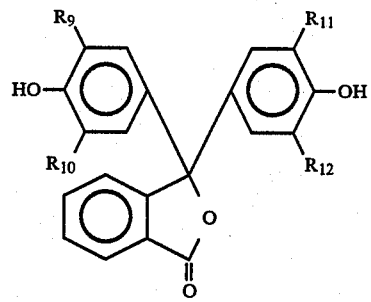

wherein $R_9$, $R_{10}$, $R_{11}$ and $R_{12}$ are independently hydrogen, lower alkyl of 1 to 4 carbon atoms or phenyl; and

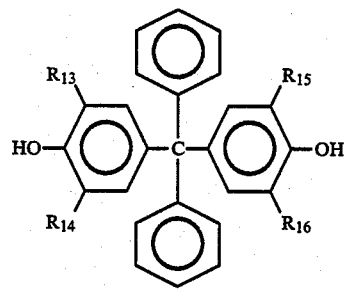

wherein $R_{13}$, $R_{14}$, $R_{15}$ and $R_{16}$ are independently hydrogen, lower alkyl of 1 to 4 carbon atoms or phenyl; and wherein the molar ratio of 5-keto-bis(hydroxyphenyl)anthracene to bisphenol is from 20:1 to 1:20; and (B) a mixture of isophthalic and terephthalic acid in a molar ratio of 9:1 to 1:9, respectively.

The present invention is further concerned with a polyarylate alloy composition comprising (A) 10 to 90% by weight of a polyarylate of the formula

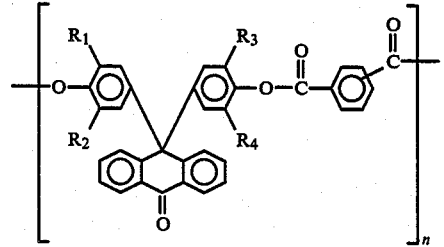

wherein $R_1$, $R_2$, $R_3$ and $R_4$ are independently hydrogen, lower alkyl of 1 to 4 carbon atoms or phenyl; n is the degree of polymerization; and wherein

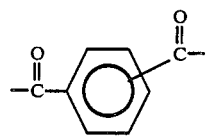

is an isophthalic or terephthalic acid moiety present in a molar ratio of 9:1 to 1:9, respectively; and (B) 10 to 90% by weight of a polymer resin selected from the group consisting of polybisphenol A carbonate and polystyrene.

Also contemplated by the present invention is a polyarylate alloy composition comprising (A) 10 to 90% by weight of a polyarylate copolymer derived from
(1) a mixture of a 5-keto-bis(hydroxyphenyl)-anthracene compound of the formula

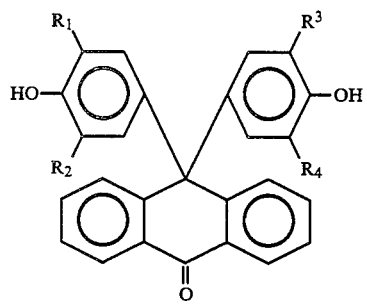

wherein $R_1$, $R_2$, $R_3$ and $R_4$ are independently hydrogen, lower alkyl of 1 to 4 carbon atoms or phenyl; and a bisphenol compound selected from the group consisting of

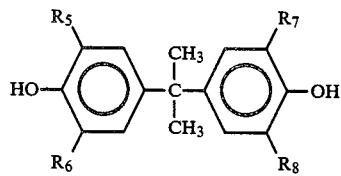

wherein $R_5$, $R_6$, $R_7$ and $R_8$ are independently hydrogen, lower alkyl of 1 to 4 carbon atoms or phenyl;

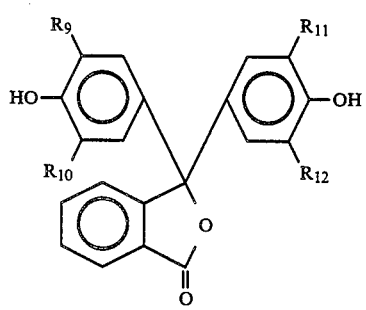

wherein $R_9$, $R_{10}$, $R_{11}$ and $R_{12}$ are independently hydrogen, lower alkyl of 1 to 4 carbon atoms or phenyl; and

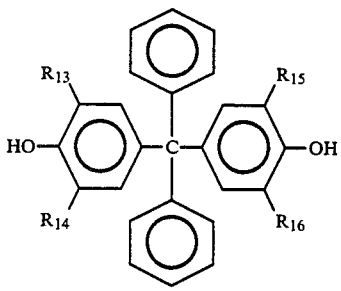

wherein $R_{13}$, $R_{14}$, $R_{15}$ and $R_{16}$ are independently hydrogen, lower alkyl of 1 to 4 carbon atoms or phenyl;

and wherein the molar ratio of 5-keto-bis(hydroxyphenyl)-anthracene to bisphenol is from 20:1 to 1:20; and (2) a mixture of isophthalic and terephthalic acid in a molar ratio of 9:1 to 1:9, respectively; and (B) 10 to 90% by weight of a polymer resin selected from the group consisting of polybisphenol A carbonate and polystyrene.

Among other factors, the present invention is based on the discovery that certain polyarylate copolymers, derived from mixtures of 5-keto-bis(hydroxyphenyl)-anthracene compounds with other bisphenols, have been found to possess superior thermal properties. In addition, it has been found that 5-keto-bis(hydroxyphenyl)anthracene polyarylates provide alloy compositions with polystyrene and polybisphenol A carbonate which also exhibit excellent thermal properties.

DETAILED DESCRIPTION OF THE INVENTION

For purposes of the present invention, those polyarylates derived from a single 5-keto-bis(hydroxyphenyl)anthracene compound shall be referred to as "homopolymers" and those polyarylates derived from a mixture of 5-keto-bis(hydroxyphenyl)anthracene and other bisphenol compounds shall be referred to as "copolymers". It is, of course, understood that 5-keto-bis(hydroxyphenyl)anthracene may be characterized as a type of bisphenol compound. Furthermore, the term "alloy" as used herein is meant to define an intimate physical mixture or blend of two or more polymers.

The 5-keto-bis(hydroxyphenyl)anthracene compounds which are useful for conversion into the instant polyarylate homopolymers and copolymers may be represented by the following formula

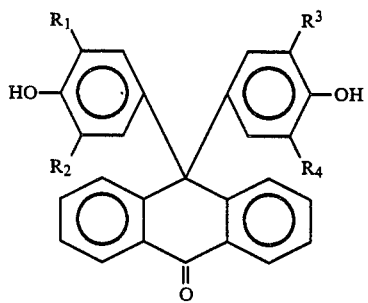

wherein $R_1$, $R_2$, $R_3$ and $R_4$ are independently hydrogen, lower alkyl of 1 to 4 carbon atoms or phenyl.

Preferred examples of 5-keto-bis(hydroxyphenyl)anthracene compounds include the unsubstituted compound and the tetraalkyl derivative. Particularly preferred compounds are those wherein $R_1$, $R_2$, $R_3$ and $R_4$ are hydrogen, i.e., 5-keto-10,10-bis(4'-hydroxyphenyl)anthracene, and wherein $R_1$, $R_2$, $R_3$ and $R_4$ are methyl, i.e., 5-keto-10,10-bis(3',5'-dimethyl-4'-hydroxyphenyl)anthracene.

The 5-keto-bis(hydroxyphenyl)anthracene compounds used in the invention are prepared by reacting an unsubstituted or ortho-substituted phenol with anthraquinone in the presence of a Friedel-Crafts catalyst. A typical substituted phenol is 2,6-dimethylphenol. Suitable Friedel-Crafts catalysts include tin tetrachloride, aluminum trichloride, and the like.

The instant polyarylate homopolymers and copolymers are prepared from the above-described 5-keto-bis(hydroxyphenyl)anthracenes or from mixtures of these compounds and other bisphenols. The instant polyarylate homopolymers are prepared from a single 5-keto-bis-(hydroxyphenyl)anthracene compound or a functional derivative thereof. Similarly, the instant polyarylate copolymers are prepared from a mixture of a 5-keto-bis(hydroxyphenyl)anthracene compound or functional derivative thereof and a bisphenol compound, or functional derivative thereof, selected from the group consisting of

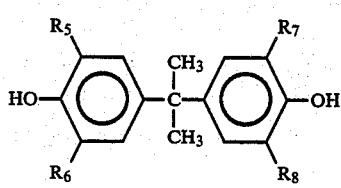

wherein $R_5$, $R_6$, $R_7$ and $R_8$ are independently hydrogen, lower alkyl of 1 to 4 carbon atoms or phenyl;

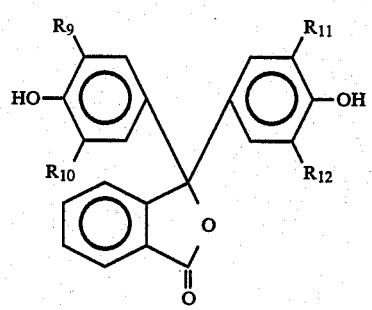

wherein $R_9$, $R_{10}$, $R_{11}$ and $R_{12}$ are independently hydrogen, lower alkyl of 1 to 4 carbon atoms or phenyl; and

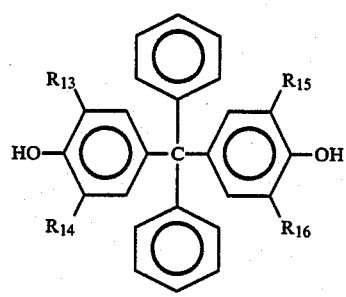

wherein $R_{13}$, $R_{14}$, $R_{15}$ and $R_{16}$ are independently hydrogen, lower alkyl of 1 to 4 carbon atoms or phenyl.

When $R_5$, $R_6$, $R_7$ and $R_8$ above are all hydrogen, the compound obtained, 2,2-bis(4-hydroxyphenyl)propane, is generally referred to as bisphenol A. When $R_5$, $R_6$, $R_7$ and $R_8$ are not all hydrogen, the compound obtained will herein be referred to as a substituted bisphenol A. Preferred examples of substituted bisphenol A include tetraalkyl bisphenol A and diphenyl bisphenol A. A particularly preferred substituted bisphenol A is tetramethyl bisphenol A or 2,2-bis(4-hydroxy-3,5-dimethylphenyl)propane. The various bisphenol A compounds are prepared by reacting an appropriately substituted phenol, such as 2,6-dimethylphenol, with acetone in the presence of a Friedel-Crafts catalyst.

Moreover, when $R_9$, $R_{10}$, $R_{11}$ and $R_{12}$ in the above formula are all hydrogen, the compound obtained, 1,1-bis(4'-hydroxyphenyl)phthalide, is commonly referred to as phenolphthalein. When $R_9$, $R_{10}$, $R_{11}$ and $R_{12}$ are not all hydrogen, the compound obtained will herein be referred to as a substituted phenolphthalein. Preferred examples of substituted phenolphthalein include the tetraalkyl derivatives, that is, wherein $R_9$, $R_{10}$, $R_{11}$ and $R_{12}$ are independently lower alkyl of 1 to 4 carbon atoms. A particularly preferred substituted phenolphthalein is that wherein $R_9$, $R_{10}$, $R_{11}$ and $R_{12}$ are methyl, that is, 1,1-bis(3',5'-dimethyl-4'-hydroxyphenyl)phthalide or, commonly, tetramethylphenolphthalein. The substituted phenolphthalein compounds are prepared by reacting an appropriate ortho-substituted phenol with phthalic anhydride in the presence of a Friedel-Crafts catalyst, such as zinc chloride.

Further, when $R_{13}$, $R_{14}$, $R_{15}$ and $R_{16}$ above are all hydrogen, the compound obtained, bis(4-hydroxyphenyl)diphenylmethane, is conveniently referred to as dihydroxytetraphenylmethane. When $R_{13}$, $R_{14}$, $R_{15}$ and $R_{16}$ are not all hydrogen, the compound obtained will herein be referred to as a substituted dihydroxytetraphenylmethane. Preferred examples of dihydroxytetraphenylmethane compounds include the unsubstituted compound and the tetraalkyl derivative. A particularly preferred substituted dihydroxytetraphenylmethane is that wherein $R_{13}$, $R_{14}$, $R_{15}$ and $R_{16}$ are methyl, that is, bis(3,5-dimethyl-4-hydroxyphenyl)diphenylmethane.

The dihydroxytetraphenylmethane compounds are prepared by reacting an appropriately substituted phenol with dichlorodiphenylmethane, preferably in the presence of a Friedel-Crafts catalyst. Typical substituted phenols include 2,6-dimethylphenol and 2-phenylphenol. Suitable Friedel-Crafts catalysts include aluminum chloride, ferric chloride, stannic chloride, boron trifluoride, zinc chloride, hydrogen fluoride, hydrogen chloride, sulfuric acid, phosphoric acid, and the like.

Typical functional derivatives of the above-described 5-keto-bis(hydroxyphenyl)anthracenes and bisphenols include the metal salts and the diesters with monocarboxylic acids having 1 to 3 carbon atoms. Preferred functional derivatives are the sodium salts, potassium salts and diacetate esters.

For the polyarylate copolymers of the present invention, the mixture of 5-keto-bis(hydroxyphenyl)anthracene and bisphenol will have a molar ratio of 5-keto-bis(hydroxyphenyl)anthracene to bisphenol of about 20:1 to 1:20. Preferably, the molar ratio of 5-keto-bis(hydroxyphenyl)anthracene to bisphenol will be about 9:1 to 1:9, more preferably, about 4:1 to 1:4.

The acid component which is reacted with the 5-keto-bis(hydroxyphenyl)anthracene or 5-keto-bis(hydroxyphenyl)anthracene-bisphenol mixture to prepare the polyarylates of the invention is a mixture of isophthalic and terephthalic acid or functional derivatives thereof in a molar ratio of about 9:1 to 1:9, respectively. Preferably, the molar ratio of isophthalic to terephthalic acid will be about 3:1 to 1:3, more preferably, about 1:1.

Preferred functional derivatives of isophthalic or terephthalic acid include acid halides, such as isophthaloyl or terephthaloyl dichloride and isophthaloyl or terephthaloyl dibromide, and diesters, such as dialkyl esters or diaryl esters, having from 1 to 6 carbon atoms per ester group. Examples of suitable diesters include diphenyl isophthalate and diphenyl terephthalate.

The polyarylate homopolymers used in the present invention can be generally represented by the formula

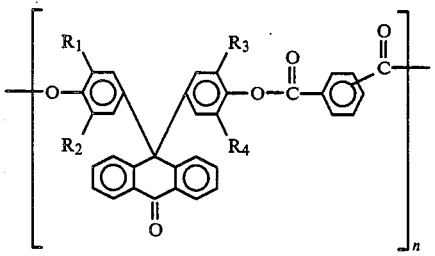

wherein $R_1$, $R_2$, $R_3$ and $R_4$ are independently hydrogen, lower alkyl of 1 to 4 carbon atoms or phenyl; and n is the degree of polymerization. Generally, n will be adjusted to provide a polymer having an average molecular weight greater than about 15,000.

In the case of the polyarylate copolymers derived from a 5-keto-bis(hydroxyphenyl)anthracene-bisphenol mixture, the 5-keto-bis(hydroxyphenyl)anthracene and bisphenol moieties will normally occur in random order throughout the polyarylate.

The polyarylates of this invention can be prepared by several methods. For example, an interfacial polycondensation process can be used. In this case an aqueous alkaline solution of a bisphenol or mixture of bisphenols and a terephthaloyl dihalide-isophthaloyl dihalide mixture dissolved in an organic solvent which is immiscible with water are mixed and reacted. Suitable interfacial polycondensation processes which can be used are disclosed, for example, in W. M. Eareckson, *J. Polymer Sci.*, XL 399 (1959) and Japanese Patent Publication No. 1959/65.

The following is a typical polycondensation process. An aqueous alkali solution of a bisphenol or mixture of bisphenols is added to a terephthaloyl dihalide-isophthaloyl dihalide mixture, more preferably, a terephthaloyl dichloride-isophthaloyl dichloride mixture, dissolved in an organic solvent, or an organic solvent solution of a terephthaloyl dihalide-isophthaloyl dihalide mixture is added to an aqueous alkaline solution of a bisphenol or mixture of bisphenols. Alternatively, an aqueous alkaline solution of a bisphenol or mixture of bisphenols and an organic solvent solution of a terephthaloyl dihalide-isophthaloyl dihalide mixture can be simultaneously added to a reaction vessel. Interfacial polycondensation takes place near the interface of the aqueous phase and the organic phase. However, since the aqueous phase and the organic phase essentially are not miscible, it is necessary to mutually disperse the phases. For this purpose an agitator or a mixer such as Homo-mixer can be used.

The concentration of the terephthaloyl dihalide-isophthaloyl dihalide mixture dissolved in the organic solvent is usually from about 2 to 25 weight %, more preferably, from 3 to 15 weight %. The concentration of the bisphenol or mixture of bisphenols in the aqueous alkaline solution is also usually from about 2 to 25 weight %, more preferably, from 3 to 15 weight %.

The amount of the bisphenol or mixture of bisphenols and of the terephthaloyl dihalide-isophthaloyl dihalide mixture used (molar ratio) is preferably maintained equivalent. An excess of the terephthaloyl dihalide-isophthaloyl dihalide mixture is not desirable in the preparation of the high molecular weight polyarylate.

Preferred alkalis are sodium hydroxide and potassium hydroxide. The concentration of the alkali in the aqueous solution can vary widely depending upon the reaction conditions, but is usually in the range from about 0.5 to 10 weight %. It is advantageous if the quantity of alkali is nearly equivalent to the hydroxy groups of the bisphenol or bisphenols used or is present in a slight excess. The preferred molar ratio of the alkali to the hydroxy group of the bisphenol or bisphenols is from 1:1 to 2:1, most preferably, from 1:1 to 1.1:1.

As organic solvents which can be used for dissolving the terephthaloyl dihalide-isophthaloyl dihalide mixture, hydrocarbons or halogenated hydrocarbons are used. For example, methylene dichloride, chloroform, tetrachloromethane, 1,2-dichloroethane, 1,1,2-trichloroethane, tetrachloroethane, benzene and methylbenzene can be employed. Especially preferred are those solvents which also dissolve the aromatic copolyesters produced. The most preferred solvent is 1,1,2-trichloroethane.

The reaction temperature is not strictly limited, and depends on the solvent used. For example, in the case of methylene dichloride, the reaction temperature is usually preferably below 40° C., with from 5° to 30° C. being especially preferred.

Interfacial polymerization is usually conducted at normal pressure and is completed in about 1 to 4 hours.

Antioxidants, dispersing agents, catalysts and viscosity stabilizers can be added to the aqueous alkaline solution or to the reaction mixture, if desired. Typical examples of such agents are as follows. As antioxidants, sodium hydrosulfite or sodium bisulfite can be used. As dispersing agents, anionic surface-active agents, such as sodium lauryl sulfate and octadecyl benzene sulfonate, cationic surface-active agents, such as cetyl trimethyl ammonium chloride, and nonionic surface-active agents such as poly(ethylene oxide) adducts can be used. As catalysts, quaternary ammonium compounds, such as trimethyl benzyl ammonium hydroxide, trimethyl benzyl ammonium chloride and triethyl benzyl ammonium chloride, tertiary sulfonium compounds, such as dimethyl-2-hydroxyphenyl sulfonium chloride, quaternary phosphonium compounds, such as triphenyl methyl phosphonium iodide and trimethyl octyl arsonium iodide can be used. Tertiary ammonium compounds, such as trimethyl amine, triethyl amine and benzyl dimethyl amine can also be used as catalysts. As viscosity stabilizers, mono-valent compounds, especially mono-valent phenol compounds, such as p-cumyl phenol, o-phenyl phenol, p-phenyl phenol, m-cresol and b-naphthol can be used, if desired.

Another useful method for forming the polyarylates is melt polymerization, as disclosed, for example, in A. Conix, *Ind. Eng. Chem.*, 51 147 (1959), in Japanese Patent Publication 15,247/63 and in U.S. Pat. No. 3,395,119.

Melt polymerization can be conducted, for example, by heating and reacting an aliphatic carboxylic acid diester of a bisphenol or mixture of bisphenols and a terephthalic acid-isophthalic acid mixture at reduced pressure. A preferred diester of a bisphenol is the diacetate. Melt polymerization can also be conducted by heating and reacting a bisphenol or mixture of bisphenols and a mixture of a diaryl ester of terephthalic acid and isophthalic acid. A typical diaryl ester is the diphenyl ester. The reaction temperature employed is in the range of from about 150° to 350° C., more preferably, from 180° to 320° C. The reaction pressure is usually varied in the course of the reaction from atmospheric pressure at the early part of the reaction to reduced pressure, such as below about 0.02 mmHg, at the end of the reaction.

In melt polymerization, the molar ratio of the bisphenol or mixture of bisphenols and the mixture of terephthalic acid-isophthalic acid components to prepare a high molecular weight polyarylate must be maintained exactly equivalent.

A number of catalysts can be used. Catalysts which are preferably used are titanium compounds, such as butyl orthotitanate and titanium dioxide. Other catalysts, such as zinc oxide, lead oxide and antimony dioxide can also be used.

Still another method for forming the polyarylates is solution polymerization, in which the polyarylates are prepared by reacting a bisphenol or mixture of bisphenols with terephthaloyl dihalide and isophthaloyl dihalide in an organic solvent solvent. Solution polymerizations which can be used are disclosed, for example, in A. Conix, *Ind. Eng. Chem.*, 51 147 (1959), and in U.S. Pat. No. 3,133,898.

In solution polymerization, the bisphenol or mixture of bisphenols and the mixture of terephthaloyl dihalide and isophthaloyl dihalide, e.g., terephthaloyl dichloride and isophthaloyl dichloride, are usually mixed in equimolar proportions in an organic solvent, and the mixture is warmed gradually to high temperatures, such as about 220° C. As the organic solvent used, those solvents which also dissolve the polyarylates produced, such as dichloroethyl benzene, are preferred. Usually, the reaction is carried out in the presence of a base to neutralize the hydrogen halide, e.g., hydrogen chloride, formed.

The polyarylate alloy compositions of the present invention are obtained by mixing the above-described polyarylate homopolymers and copolymers with a polymer resin selected from the group consisting of polybisphenol A carbonate and polystyrene. In general, the alloy composition will contain about 10 to 90% by weight of polyarylate and about 90 to 20% by weight of polybisphenol A carbonate or polystyrene. Preferably, the alloy composition will contain about 20 to 80% by weight of polyarylate and about 80 to 20% by weight of polybisphenol A carbonate or polystyrene. The polystyrene will normally have an average molecular weight of about 100,000 to 1,000,000, preferably about 300,000. The polybisphenol A carbonate will normally have an average molecular weight of about 20,000 to 50,000 preferably about 30,000.

To add polybisphenol A carbonate or polystyrene to the polyarylates of this invention, any well known mixing technique can be used. For example, grains or powders of these two components can be mixed and blended with a V-blender, Henschel mixer, Super mixer or Kneader, and then the mixture immediately molded. Alternatively, the mixture can be formed into pellets after melting with an extruder, a co-kneader, an intensive mixer, or the like, and then molded. The pelletizing or molding temperature is generally in the range of from about 250° to 350° C., more preferably, 260° to 320° C.

Another addition method comprises adding the polybisphenol A carbonate or polystyrene to a solution of the polyarylate and then evaporating off the solvent. As the solvent, those which dissolve the polyarylate can be used, such as methylene dichloride, tetrachloroethane and chloroform. The preferred solvent is tetrachloroethane. The solution of polymers in a solvent may be poured into a nonsolvent to precipitate the polymer and the precipitated alloy can be removed by filtration. Suitable nonsolvents are the lower alcohols, such as methanol, ethanol, propanol, butanol and the like. An especially preferred nonsolvent is ethanol.

The most suitable method for any particular system can be chosen according to the composition and the desired shape and properties of the molded articles to be produced therefrom.

In order to improve the heat resistance, light stability, weatherability or oxidation resistance of the composition or articles produced according to this invention, agents preventing thermal degradation, antioxidants, ultraviolet absorbants, and the like, can be added thereto, if desired. For example, benzotriazole, aminophenyl benzotriazole, benzophenone, trialkyl phosphates, such as trioctyl phosphate and tributyl phosphate, trialkyl phosphates, such as trioctyl phosphite, and triaryl phosphites, such as triphenyl phosphite, can be used, These materials are conveniently added to the polyarylate copolymers and alloys of this invention at any time prior to molding. Known plasticizers, such as phthalate esters, e.g., dioctyl terephthalate, dioctyl orthophthalate and dioctyl isophthalate, and colorants, such as carbon black and titanium dioxide, may also be added if desired, in commonly used amounts as are known in this art.

The polyarylate polymers and alloys of this invention can be used to form many useful articles using generally known molding methods, such as injection molding, extrusion molding, press molding, and the like. Typical examples of final products produced therefrom are films, monofilaments, fibers, injection molded materials, such as machine parts, automobile parts, electrical parts, vessels and springs. The polyarylate polymers and alloys of this invention find special use as engineering plastics for various uses which require good properties.

The following examples are provided to illustrate the invention in accordance with the principles of this invention but are not to be construed as limiting the invention in any way except as indicated by the appended claims. In the examples, the term "polycarbonate" refers to polybisphenol A carbonate.

EXAMPLES

Example 1

Preparation of
5-keto-10,10-bis(4'-hydroxyphenyl)anthracene

A 500 ml round bottom, three-necked flask equipped with mechanical stirrer, water condenser, thermometer and nitrogen gas inlet tube was connected to a nitrogen supply line with a needle valve as a regulator. In the flask was placed 81.0 g (0.39 mole) of anthraquinone, 81.0 g (0.86mole) of phenol and 100 g (0.38 mole) of anhydrous stannic chloride. As the mixture was stirred and heated at 100° to 110° C. by an oil bath, 14.0 g (0.1 mole) of aluminum chloride was added in small portions. The mixture was then stirred and maintained at a temperature between 100° to 110° C. over a period of 20 hours. The reaction mixture was a dark brown slurry.

Four hundred ml of hot water was then added to the flask. The product was filtered and washed with an additional 2.5 liters of hot water. The crude product was dissolved in a 10% NaOH solution and filtered. The insoluble portion was discarded. The filtrate portion was then acidified with a 10% HCl solution. A yellowish precipitate was formed. The solid product was filtered and washed with distilled water. The residual water was removed by drying the product in a vacuum oven at 100° C. overnight with nitrogen passing through slowly. The product was then recrystallized three times from a mixed solvent of ethanol, dimethylsulfoxide and water. Each time the crystals were collected by suction filtration and washed with a minimum amount of cold ethanol. The solvent was removed by drying in a vacuum oven at 100° C. in a nitrogen atmosphere overnight. The yield was 110 g, 74% of theory. The product was a colorless powder having a melting point of 328° to 330° C. The product was analyzed for the percent of carbon and hydrogen. Analytical calculated for $C_{26}H_{18}O_3$: C, 82.52; H, 4.75. Found: C, 82.43; H, 4.75. NMR(acetone-$d_6$):δ8.2–8.0 (m, 2, ArH), 7.0–7.6 (m, 6, ArH), 6.7 (s, 8, ArH), 2.8 (s, 2, ArOH).

Example 2

Preparation of
5-keto-10,10-bis(4'-hydroxyphenyl)anthracene
iso/terephthalate Polymer A 500-ml, three-necked flask equipped with a mechanical stirrer, thermometer, and nitrogen gas inlet and outlet was charged with 7.56 grams (0.02 mole) of 5-keto-10,10-bis(4'-hydroxyphenyl)anthracene, 0.20 gram (0.0009 mole) of triethylbenzyl ammonium chloride, 0.02 gram sodium bisulfite, 1.76 grams (0.044 mole) of sodium hydroxide, 135 ml of water, and 30 ml of 1,1,2-trichloroethane. The reaction mixture was stirred at a motor speed of 1000 rpm under a nitrogen atmosphere at a temperature not exceeding 10° C. maintained by an ice water bath. The stirrer speed was checked by a photo tachometer. A mixed solution of terephthaloyl dichloride, 2.03 grams (0.01 mole), and isophthaloyl dichloride, 2.03 grams (0.01 mole), in 49 ml of 1,1,2-trichloroethane was added over a period of 30 minutes. At the same time, the mixture was vigorously stirred. The ice water bath was then replaced with a room temperature water bath and stirring was continued for an additional four hours. Subsequently, the upper aqueous layer was decanted and replaced by 100 ml of distilled water and 30 ml of 1,1,2-trichloroethane. The mixture was again stirred for 30 minutes. The resulting aqueous layer was decanted and removed. The organic layer was poured into 600 ml of 200-proof ethanol. A white polymer was precipitated which was collected by suction filtration. The polymer was washed four times with 200 ml ethanol. The yield of polymer was 8.40 grams. It was a 76.3% yield. The polymer was dissolved in a mixed solvent of 40/60 phenol and 1,1,2,2-tetrachloroethane by rotating it overnight. The Gardner viscosity of a 10% solution was 5.50 poises at 25° C. The glass transition temperature, Tg, measured by differential scanning calorimetry (DSC), was 318° C.

Example 3

Preparation of
5-keto-10,10-bis(4'-hydroxyphenyl)anthracene
bisphenol A iso/terephthalate copolymer A 500 ml, three-necked flask equipped with a mechanical stirrer, thermometer, and nitrogen inlet and outlet was charged with 2.27 grams (0.006 mole, 20 mole %) of 5-keto-10,10-bis(4'-hydroxyphenyl) anthracene, 5.48 grams (0.024 mole, 80 mole %) of bisphenol A, 0.20 gram 0.0009 mole) of triethylbenzyl ammonium chloride, 0.02 gram of sodium bisulfite, 2.84 grams (0.066 mole) of sodium hydroxide, 135 ml of water, and 30 ml of 1,1,2-trichloroethane. The reaction mixture was stirred at a motor speed of 1000 rpm under nitrogen atmosphere at a temperature not exceeding 10° C. monitored by an ice water bath. A mixed solution of terephthaloyl dichloride, 3.05 grams (0.015 mole), and isophtholoyl dichloride, 3.05 grams (0.015 mole), in 40 ml of 1,1,2-trichloroethane was added over a period of 30 minutes. At the same time, the mixture was vigorously stirred. The ice water bath was then removed and replaced with a room temperature water bath. Stirring was continued for an additional four hours. Subsequently, the upper layer was decanted and replaced by 100 ml of distilled water and 30 ml of 1,1,2-trichloroethane. The mixture was again stirred for 30 minutes. The resulting aqueous layer was poured into 600 ml of 200-proof ethanol. A white polymer was precipitated which was collected by suction filtration. The polymer was washed four times with 200 ml of ethanol. The product was placed in a vacuum oven at 100° C. overnight. The yield of polymer was 10.7 grams. This was a 77.3% yield. The polymer was dissolved for Gardner viscosity in a mixed solvent of 40/60 phenol and 1,1,2,2-tetrachloroethane by rotating it overnight. The Gardner viscosity of a 10% polymer solution was 3.70 poises at 25° C. Reduced viscosity was measured at 0.25 g/100 ml in 1,1,2,2-tetrachloroethane. Reduced viscosity was 0.64 dl/g at 25° C. The glass transition temperature, Tg, measured by differential scanning calorimetry, was 227° C.

Following the above procedure, copolymers were prepared using other bisphenol monomers in place of bisphenol A. The glass transition temperature, Tg, of these copolymers at various mole ratios of bisphenols is shown in Table 1.

TABLE 1

5-Keto-10-,10-bis-(4'-hydroxyphenyl) Anthracene Copolyarylates With Various Bisphenols and Iso/Terephthalic Acid 1/1

| Comonomer Bisphenol | Mole % Comonomer | Tg, °C. |
|---|---|---|
| Bisphenol A | 20 | 215 |
|  | 40 | 238 |
|  | 60 | 246 |
|  | 80 | 227 |
| 2,2-Bis-(4-hydroxy-3,5-dimethylphenyl) Propane | 20 | 298 |
|  | 40 | 295 |
|  | 60 | 251 |
|  | 80 | 215 |
| Bis-(4-hydroxyphenyl) Diphenylmethane | 20 | 317 |
|  | 40 | 285 |
|  | 60 | 243 |
|  | 80 | 227 |
| Bis-(3,5-dimethyl-4-hydroxyphenyl) Diphenylmethane | 40 | 309 |
|  | 60 | 271 |
|  | 80 | 264 |
| 1,1-Di-(3',5'-dimethyl-4'-hydroxyphenyl) Phthalide | 20 | 311 |
|  | 40 | 322 |
|  | 60 | 311 |
|  | 80 | 289 |

Example 4

Preparation of the Alloy of 5-Keto-10,10-bis-(4'-hydroxyphenyl) Anthracene Iso/Terephthalate With Polycarbonate In a 20-ml vial was placed 1.0 gram of 5-keto-10,10-bis(4'-hydroxyphenyl) anthracene iso/terephthalate, 1.0 gram of polycarbonate (Lexan 141), and 18.0 grams of 1,1,2,2-tetrachloroethane. The vial was placed on a rotator and rotated until the mixture was completely dissolved. This was now a 1:1 solution of polymers by weight. Two milliliters of the above polymer solution was placed on 2.5 in.×5 in. glass plate. A film was cast with a 0.02 in. thickness doctor blade. The cast film was first dried at room temperature in the hood until most of the solvent had evaporated. The glass plate with film was transferred to a forced air oven at 40° C. for four hours and at 75° C. for an additional four hours. The glass with film was removed from the oven and examined for its compatibility. The remainder of the polymer solution was poured into 150 ml of 200-proof ethanol. A white polymer was precipitated which was collected by suction filtration. The polymer was washed four times with 50 ml of ethanol. The polymer was placed in a vacuum oven at 100° C. until the weight was constant.

Following the above procedure, various alloys were prepared having different weight ratios of polymers. The glass transition temperature, Tg, for these alloys is shown in Table 2.

TABLE 2

| Polyarylate, Wt % | Polycarbonate, Wt % | Tg, °C. |
|---|---|---|
| 20 | 80 | 148 |
| 50 | 50 | 158 |
| 80 | 20 | 269 |

What is claimed is:

1. A polyarylate copolymer prepared by reacting (A) a mixture of a 5-keto-bis(hydroxyphenyl)anthracene compound of the formula

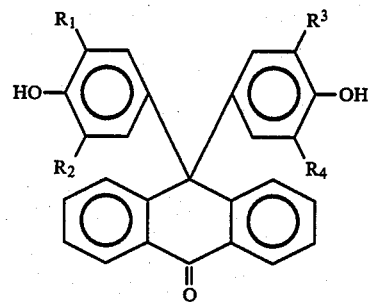

wherein $R_1$, $R_2$, $R_3$ and $R_4$ are independently hydrogen, lower alkyl of 1 to 4 carbon atoms or phenyl; or a polyarylate-forming derivative thereof; and a bisphenol compound selected from the group consisting of

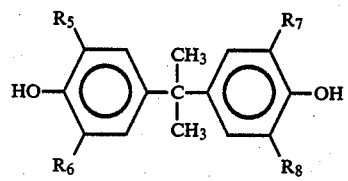

wherein $R_5$, $R_6$, $R_7$ and $R_8$ are independently hydrogen, lower alkyl of 1 to 4 carbon atoms or phenyl;

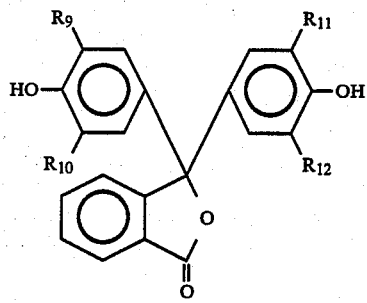

wherein $R_9$, $R_{10}$, $R_{11}$ and $R_{12}$ are independently hydrogen, lower alkyl of 1 to 4 carbon atoms or phenyl; and

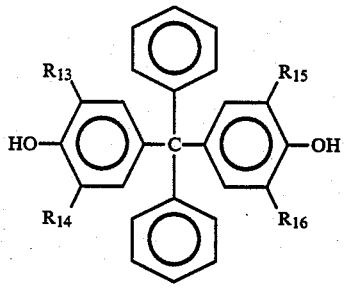

wherein $R_{13}$, $R_{14}$, $R_{15}$ and $R_{16}$ are independently hydrogen, lower alkyl of 1 to 4 carbon atoms or phenyl;
or a polyarylate-forming derivative of said bisphenol compound; and
wherein the molar ratio of 5-keto-bis(hydroxyphenyl)anthracene to bisphenol is from 20:1 to 1:20; and (B) a mixture of isophthalic and terephthalic acid or polyarylate-forming derivatives thereof, in a molar ratio of 9:1 to 1:9, respectively.

2. The copolymer according to claim 1, wherein $R_1$, $R_2$, $R_3$ and $R_4$ are hydrogen.

3. The copolymer according to claim 1, wherein $R_1$, $R_2$, $R_3$ and $R_4$ are independently lower alkyl of 1 to 4 carbon atoms.

4. The copolymer according to claim 3, wherein $R_1$, $R_2$, $R_3$ and $R_4$ are methyl.

5. The copolymer according to claim 1, wherein the bisphenol compound is

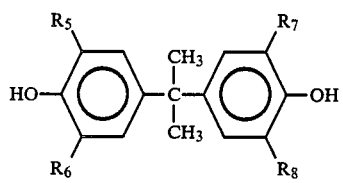

wherein $R_5$, $R_6$, $R_7$ and $R_8$ are independently hydrogen, lower alkyl of 1 to 4 carbon atoms or phenyl.

6. The copolymer according to claim 5, wherein $R_5$, $R_6$, $R_7$ and $R_8$ are hydrogen.

7. The copolymer according to claim 5, wherein $R_5$, $R_6$, $R_7$ and $R_8$ are independently lower alkyl of 1 to 4 carbon atoms.

8. The copolymer according to claim 7, wherein $R_5$, $R_6$, $R_7$ and $R_8$ are methyl.

9. The copolymer according to claim 1, wherein the bisphenol compound is

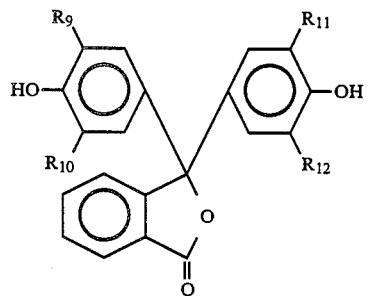

wherein $R_9$, $R_{10}$, $R_{11}$ and $R_{12}$ are independently hydrogen, lower alkyl of 1 to 4 carbon atoms or phenyl.

10. The copolymer according to claim 9, wherein $R_9$, $R_{10}$, $R_{11}$ and $R_{12}$ are hydrogen.

11. The copolymer according to claim 9, wherein $R_9$, $R_{10}$, $R_{11}$ and $R_{12}$ are independently lower alkyl of 1 to 4 carbon atoms.

12. The copolymer according to claim 11, wherein $R_9$, $R_{10}$, $R_{11}$ and $R_{12}$ are methyl.

13. The copolymer according to claim 1, wherein the bisphenol compound is

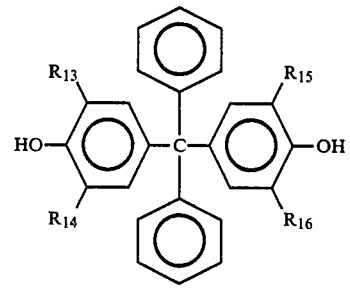

wherein $R_{13}$, $R_{14}$, $R_{15}$ and $R_{16}$ are independently hydrogen, lower alkyl of 1 to 4 carbon atoms or phenyl.

14. The copolymer according to claim 13, wherein $R_{13}$, $R_{14}$, $R_{15}$ and $R_{16}$ are hydrogen.

15. The copolymer according to claim 13, wherein $R_{13}$, $R_{14}$, $R_{15}$ and $R_{16}$ are independently lower alkyl of 1 to 4 carbon atoms.

16. The copolymer according to claim 15, wherein $R_{13}$, $R_{14}$, $R_{15}$ and $R_{16}$ are methyl.

17. The copolymer according to claim 1, wherein the molar ratio of isophthalic to terephthalic acid is about 3:1 to 1:3.

18. The copolymer according to claim 17, wherein the molar ratio of isophthalic to terephthalic acid is about 1:1.

19. The copolymer according to claim 1, wherein the molar ratio of 5-keto-bis(hydroxyphenyl)anthracene to bisphenol is about 9:1 to 1:9.

20. The copolymer according to claim 19, wherein the molar ratio of 5-keto-bis(hydroxyphenyl)anthracene to bisphenol is about 4:1 to 1:4.

21. A polyarylate alloy composition comprising
(A) 10 to 90% by weight of a polyarylate of the formula

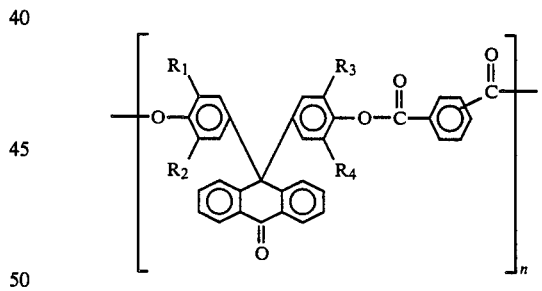

wherein $R_1$, $R_2$, $R_3$ and $R_4$ are independently hydrogen, lower alkyl of 1 to 4 carbon atoms or phenyl; n is the degree of polymerization; and wherein

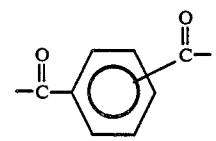

is an isophthalic or terephthalic acid moiety present in a molar ratio of 9:1 to 1:9, respectively; and
(B) 10 to 90% by weight of a polymer resin selected from the group consisting of polybisphenol A carbonate and polystyrene.

22. The composition according to claim 21, wherein $R_1$, $R_2$, $R_3$ and $R_4$ are hydrogen.

23. The composition according to claim 21, wherein R₁, R₂, R₃ and R₄ are independently lower alkyl of 1 to 4 carbon atoms.

24. The composition according to claim 23, wherein R₁, R₂, R₃ and R₄ are methyl.

25. The composition according to claim 21, wherein the molar ratio of the isophthalic to terephthalic acid moiety is about 3:1 to 1:3.

26. The composition according to claim 25, wherein the molar ratio of the isophthalic to terephthalic acid moiety is about 1:1.

27. The composition according to claim 21, wherein component (B) is polybisphenol A carbonate.

28. The composition according to claim 21, wherein component (B) is polystyrene.

29. A polyarylate alloy composition comprising
(A) 10 to 90% by weight of a polyarylate copolymer prepared by reacting
  (1) a mixture of a 5-keto-bis(hydroxyphenyl)anthracene compound of the formula

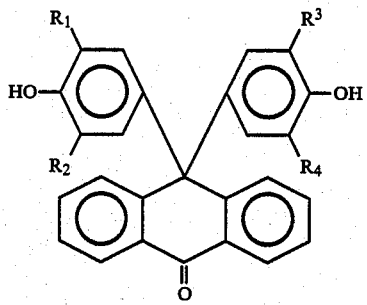

wherein R₁, R₂, R₃ R₄ are independently hydrogen, lower alkyl of 1 to 4 carbon atoms or phenyl; or a polyarylate-forming derivative thereof; and a bisphenol compound selected from the group consisting of

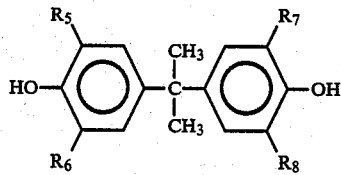

wherein R₅, R₆, R₇ and R₈ are independently hydrogen, lower alkyl or 1 to 4 carbon atoms or phenyl;

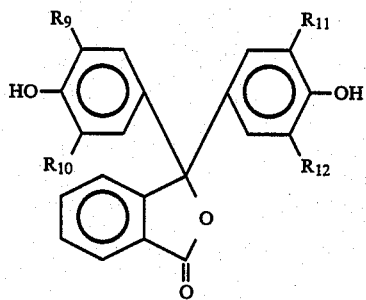

wherein R₉, R₁₀, R₁₁ and R₁₂ are independently hydrogen, lower alkyl or 1 to 4 carbon atoms or phenyl; and

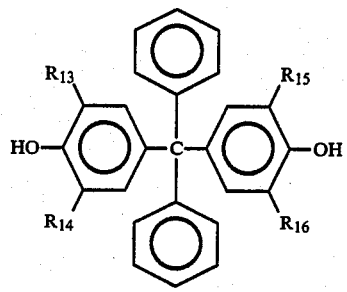

wherein R₁₃, R₁₄, R₁₅ and R₁₆ are independently hydrogen, lower alkyl of 1 to 4 carbon atoms or phenyl;
or a polyarylate-forming derivative of said bisphenol compound; and
wherein the molar ratio of 5-keto-bis(hydroxyphenyl)anthracene to bisphenol is from 20:1 to 1:20; and
(2) a mixture of isophthalic and terephthalic acid or polyarylate-forming derivatives thereof, in a molar ratio of 9:1 to 1:9, respectively; and
(B) 10 to 90% by weight of a polymer resin selected from the group consisting of polybisphenol A carbonate and polystyrene.

30. The composition according to claim 29, wherein R₁, R₂, R₃ and R₄ are hydrogen.

31. The composition according to claim 29, wherein R₁, R₂, R₃ and R₄ are independently lower alkyl of 1 to 4 carbon atoms.

32. The composition according to claim 31, wherein R₁, R₂, R₃ and R₄ are methyl.

33. The composition according to claim 29, wherein the bisphenol compound is

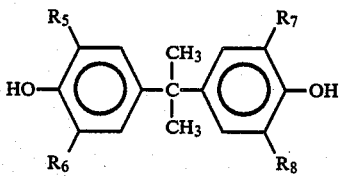

wherein R₅, R₆, R₇ and R₈ are independently hydrogen, lower alkyl of 1 to 4 carbon atoms or phenyl.

34. The composition according to claim 33, wherein R₅, R₆, R₇ and R₈ are hydrogen.

35. The composition according to claim 33, wherein R₅, R₆, R₇ and R₈ are independently lower alkyl of 1 to 4 carbon atoms.

36. The composition according to claim 35, wherein R₅, R₆, R₇ and R₈ are methyl.

37. The composition according to claim 29, wherein the bisphenol compound is

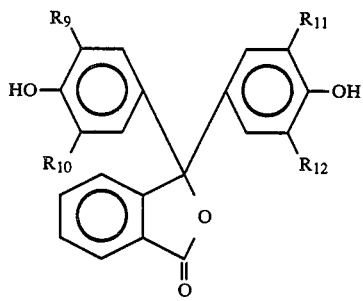

wherein $R_9$, $R_{10}$, $R_{11}$ and $R_{12}$ are independently hydrogen, lower alkyl of 1 to 4 carbon atoms or phenyl.

38. The composition according to claim 37, wherein $R_9$, $R_{10}$, $R_{11}$ and $R_{12}$ are hydrogen.

39. The composition according to claim 37, wherein $R_9$, $R_{10}$, $R_{11}$ and $R_{12}$ are independently lower alkyl of 1 to 4 carbon atoms.

40. The composition according to claim 39, wherein $R_9$, $R_{10}$, $R_{11}$ and $R_{12}$ are methyl.

41. The composition according to claim 29, wherein the bisphenol compound is

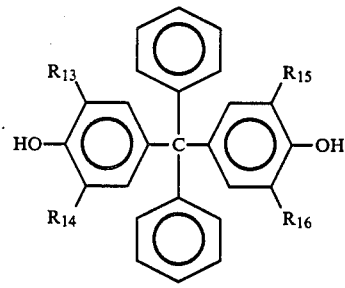

wherein $R_{13}$, $R_{14}$, $R_{15}$ and $R_{16}$ are independently hydrogen, lower alkyl of 1 to 4 carbon atoms or phenyl.

42. The composition according to claim 41, wherein $R_{13}$, $R_{14}$, $R_{15}$ and $R_{16}$ are hydrogen.

43. The composition according to claim 41, wherein $R_{13}$, $R_{14}$, $R_{15}$ and $R_{16}$ are independently lower alkyl of 1 to 4 carbon atoms.

44. The composition according to claim 43, wherein $R_{13}$, $R_{14}$, $R_{15}$ and $R_{16}$ are methyl.

45. The composition according to claim 29, wherein the molar ratio of isophthalic to terephthalic acid is about 3:1 to 1:3.

46. The composition according to claim 45, wherein the molar ratio of isophthalic to terephthalic acid is about 1:1.

47. The composition according to claim 29, wherein the molar ratio of 5-keto-bis(hydroxyphenyl)anthracene to bisphenol is about 9:1 to 1:9.

48. The composition according to claim 47, wherein the molar ratio of 5-keto-bis(hydroxyphenyl)anthracene to bisphenol is about 4:1 to 1:4.

49. The composition according to claim 29, wherein component (B) is polybisphenol A carbonate.

50. The composition according to claim 29, wherein component (B) is polystyrene.

* * * * *